J. M. EADIE.
VEHICLE BRAKE.
APPLICATION FILED MAY 19, 1919.
1,432,981.
Patented Oct. 24, 1922.
2 SHEETS—SHEET 1.
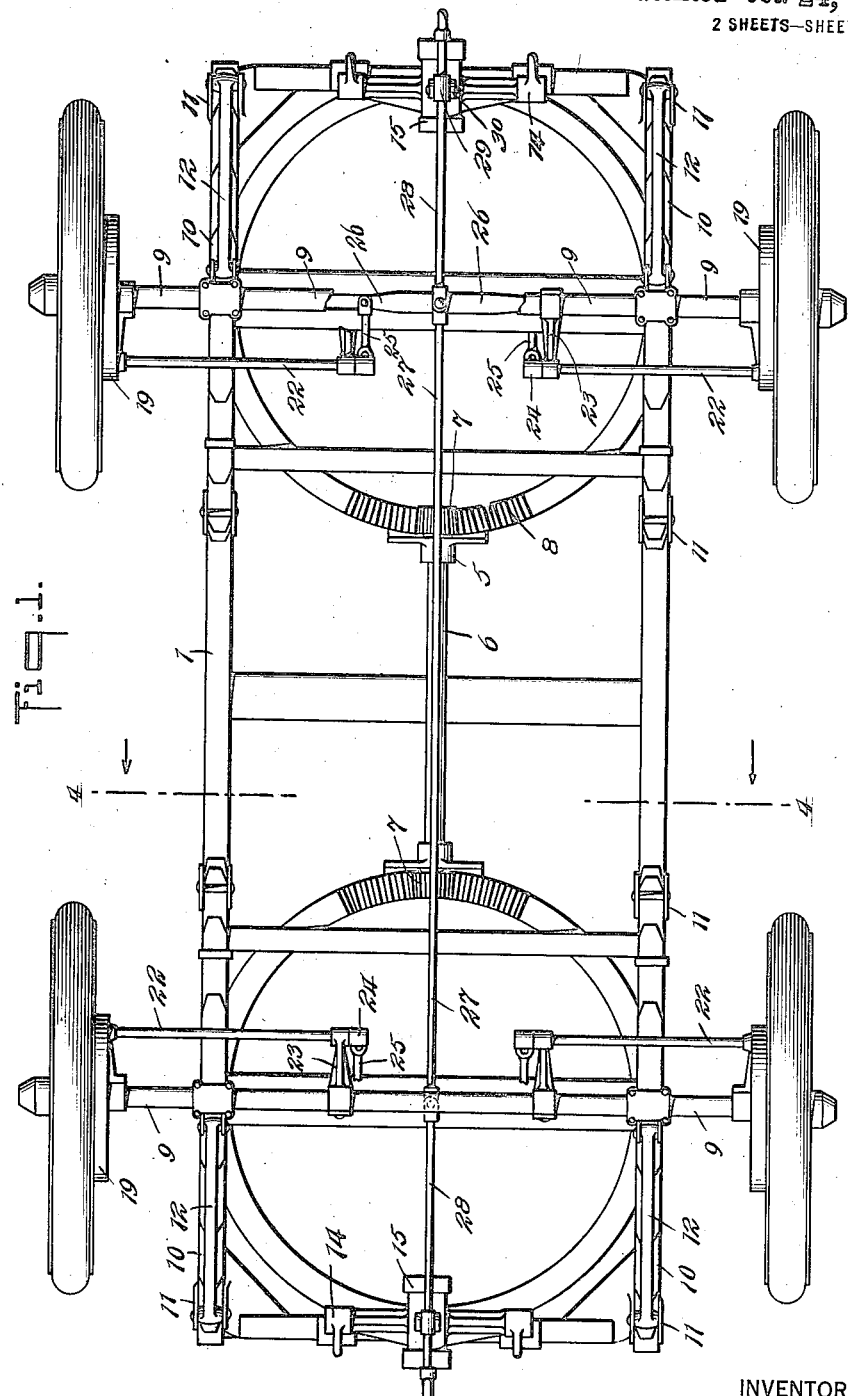
INVENTOR
John M. Eadie
BY
Kenyon & Kenyon
his ATTORNEYS

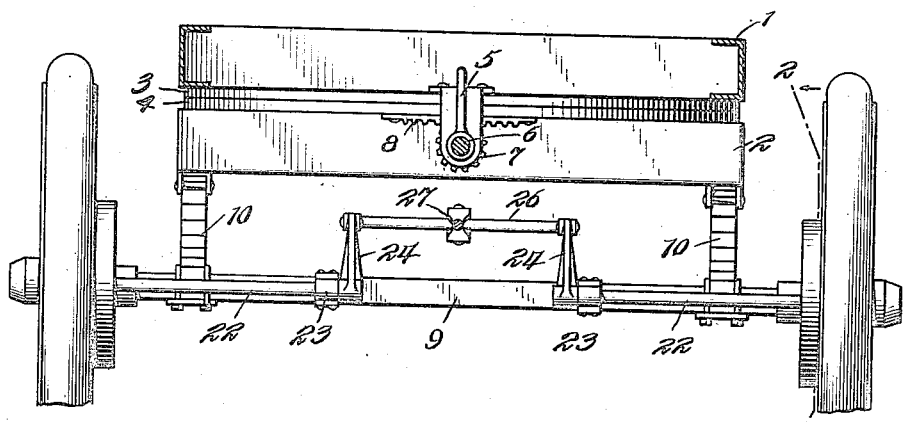
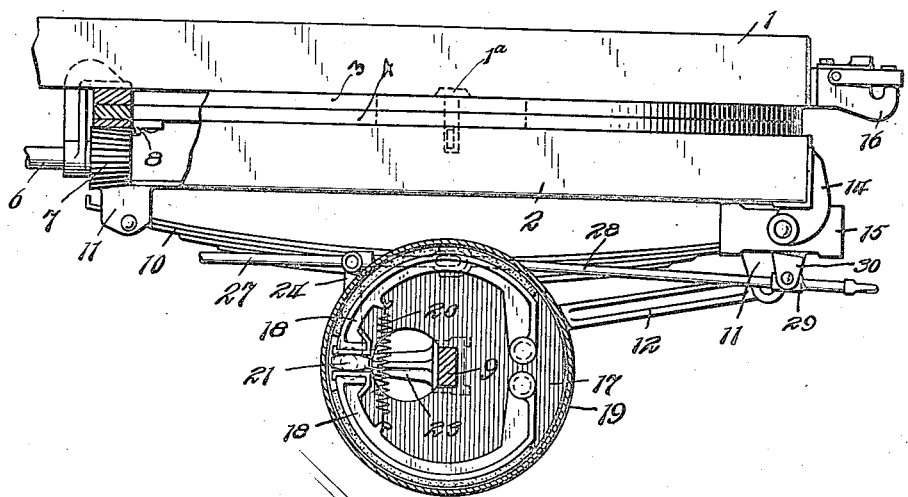
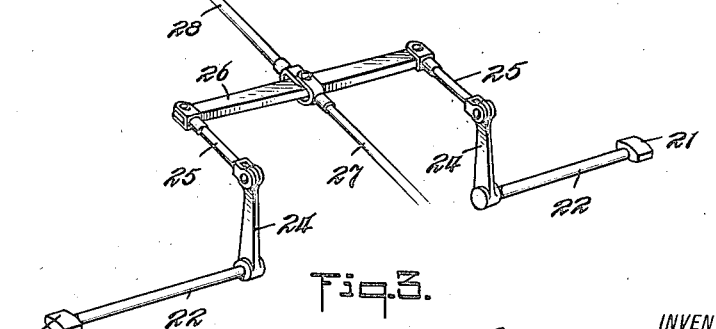

Patented Oct. 24, 1922.

1,432,981

UNITED STATES PATENT OFFICE.

JOHN M. EADIE, OF NEW YORK, N. Y.

VEHICLE BRAKE.

Application filed May 19, 1919. Serial No. 298,146.

*To all whom it may concern:*

Be it known that I, JOHN M. EADIE, a citizen of the Dominion of Canada, residing in New York city, N. Y., have invented new and useful Improvements in Vehicle Brakes, of which the following is a specification.

My invention relates to vehicles and particularly to that type of vehicle which is adapted to be attached to another vehicle during its movement. And, furthermore, my invention relates especially to brakes for such vehicles.

An object of my invention is to provide braking means for a short turn vehicle, that is a vehicle having all its wheels mounted for steering, which means will not be affected by the steering of the vehicle.

Another object of my invention is to provide a braking means for a vehicle adapted to be attached to another vehicle for movement, which means will be operable from the attached vehicle.

Another object of my invention is to provide braking means for a vehicle which is adapted to be attached to another vehicle, which means will be operable from either end of the vehicle.

Other and further objects and advantages of my invention will appear from the following description, taken in connection with the accompanying drawings forming part of this specification and in which—

Fig. 1 is a plan view, looking upward from underneath, with parts broken away, of a vehicle provided with braking mechanism embodying my invention.

Fig. 2 is a partial sectional view, on the line 2—2 of Fig. 4, of a portion of the vehicle shown in Fig. 1.

Fig. 3 is a skeletonized view of part of the braking mechanism shown in Fig 1.

Fig. 4 is a sectional view on the line 4—4 in Fig. 1.

For the purpose of disclosing my invention I have shown it as embodied in a trailer which comprises a main frame or body member 1, built up of channel sections and two auxiliary members 2, which are rectangular in form and built up of channel sections, and which are secured to the main frame 1 for rotation thereon—for example by means of king bolts 1ª, Fig. 2.

Attached to the lower side of the main frame 1 there are bearing rings 3 and on the upper sides of the auxiliary members 2 there are bearing rings 4, which bear upon the rings 3. Brackets 5, supported upon the rings 3, carry a shaft 6 upon the ends of which are bevel gears 7, which co-operate with racks 8 secured to the underside of the bearing rings 4.

Axles 9 have springs 10 secured to them and the springs 10 have sliding bearings in the brackets 11, secured to the side members of the auxiliary members 2. In order to hold the axles in proper relation to the pivots of the auxiliary members, radius rods 12 are attached to the axles and to the outer spring brackets 11.

Secured to the outer ends of the auxiliary members 2 there are brackets 14, which have mounted in them, for rotation in a vertical plane, coupling bars 15. Attached to opposite ends of main frame 1 are draw bars 16.

From the structure so far described it will be apparent that the trailer may be moved along by attaching a tractor or preceding trailer to one of the couplers 15, and that trailers may be drawn behind any given trailer by attaching its coupling member to one of the draw bars 16 of the preceding trailer.

It will further be apparent that any turning of the preceding vehicle, whether it be tractor or trailer, will impart a rotation to one of the auxiliary members 2 and to the axle attached to it, through the coupler 15 attached thereto, and an equal and opposite rotation will be imparted to the other auxiliary member and the axle attached thereto, through the racks, gears and shaft; thus effecting a short turn and tracking of the trailer.

Upon each end of each axle there is secured a plate 17, and pivoted to this plate there are brake shoes 18, provided with appropriate friction surfaces, which are held out of contact with the interior of the brake drums 19, one of which is secured to each wheel, by means of springs 20. Cams 21 are positioned between the free ends of the brake shoes 18 so that by turning of the cam the brake shoes are spread apart and the braking action is effected. Cams 21 are secured to brake shafts 22, which extend inwardly through the plates 17 and are supported in brackets 23, secured to axles 9.

On the inner ends of the shafts 22 are upwardly extending arms 24, Fig. 3, which are attached by means of links 25 to equalizing members 26, which are positioned over the axles 9 and pass through the pivotal axes of the respective axles. A brake operating rod 27 extends from one equalizing member 26 to the other and is pivotably secured to the equalizing members in the pivotal axes of the axles. Other brake operating rods 28 extend from the point where the pivotal axes pass through the equalizing members, outwardly towards the ends of the vehicle and are slidably supported in sleeves 29, which are pivoted between ears 30 extending downwardly from the coupling member 15.

It will be apparent from the structure above described that the steering of the vehicle may be effected by turning its axles upon their pivots without affecting the brake operating mechanism for there will be a mere turning of the equalizing members upon the pivots which lie in the pivotal axes of the axles. But the brakes may be simultaneously applied to all the wheels by longitudinal movement of either of the operating members 28 by means of a flexible tension member (not shown) extending from the preceding vehicle and attached to the end of the brake operating rod 28.

Furthermore, it will be apparent that although the axles support the auxiliary members, together with the steering mechanism and the body of the vehicle through loosely mounted springs, the axles will be held firmly in proper relation to their pivots, by means of the radius rods so that the brakes will not be accidentally applied.

Although I have described the details of the structure herein illustrated, for the purpose of disclosing my invention, I do not intend that my invention shall be limited to these details, but intend that it shall be defined by the hereunto appended claims.

I claim—

1. In a short turn trailer, the combination of two pairs of steerable wheels, brakes on all of said wheels, connections tying all of said brakes together for simultaneous operation in all steering positions of the two pairs of wheels, said connections including parts disposed in the pivotal axes of the steerable wheels, and a single means for operating said brakes.

2. In a short turn trailer, the combination of two pairs of steerable wheels, brakes on all of said wheels, brake operating connections disposed in the pivotal axes of the wheels and a single means for operating said brakes simultaneously.

3. In a vehicle, a body member, two axles pivoted thereon for steering, wheels on opposite ends of said axles, brakes on all of said wheels, operating mechanism for each of said brakes, equalizing members positioned respectively in the pivotal axes of said axles, and connecting the respective operating mechanisms of the brakes on each axle, and an operating member attached to said equalizing members substantially at said axes.

4. In a vehicle, the combination of a body, two pairs of steerable wheels on said body, brake drums and cooperating brake bands on each of said wheels, connections tying each pair of brakes together for simultaneous and equal operation, further connections assuring brake operation in all steering positions, a single means cooperating with said connections for operating all of said brakes.

5. In a vehicle, a body member, axles pivoted thereon for steering, wheels on said axles, brakes on all of said wheels, connections tying said brakes together for simultaneous and equal operation comprising parts disposed in the pivotal axes of the axles, and means for operating said brakes simultaneously.

6. In a vehicle, a body member, two axles pivoted thereon for steering, wheels on opposite ends of said axles, brakes on all of said wheels, operating mechanism for each of said brakes, members connecting the respective operating mechanisms of the brakes on each axle, a member connecting said last-named members, a bracket moving with one of said axles, and a member supported in said bracket and connected to one of said members.

7. In a vehicle, a body member, an axle pivoted thereto, a wheel on each end thereof, a brake on each wheel, operating mechanism for each brake, a member connecting said operating mechanisms and positioned in the pivotal axis of said axle, and an operating member attached to said member substantially at said axis.

8. In a vehicle, a body member, a pair of axles pivoted thereto, wheels on said axles, brake mechanism for each wheel, members connecting the brake mechanisms of wheels on the same axle and respectively lying in the pivotal axes of said axles, and a member attached to said last-named members substantially at said axes.

9. In a vehicle, a body member, an axle pivoted thereto, wheels on said axle, brakes for said wheels, a brake operating shaft for each of said brakes and having an arm secured thereto, a member connecting said arms and passing through the axis of the pivot of said axle and an operating member secured to said member substantially at said axis.

10. In a vehicle, a body member, two axles pivoted to said body member, wheels on said axles, brake mechanism on each axle including a member in the pivotal axis of its respective axle, and a member connected to said last-mentioned members.

11. In a vehicle, a body member, two axles pivoted to said body member, wheels on said axles, brake mechanism on each axle including a member in the pivotal axis of its respective axle, and a member connected to said last-mentioned members substantially at said axes.

12. In a vehicle, a body member, two axles pivoted to said body member, wheels on said axles, brake mechanism on each axle including a member in the pivotal axis of its respective axle, and operating mechanism connected to said last-mentioned members and extending out at both ends of said vehicle.

13. In a vehicle, a body member, two axles pivoted to said body member, wheels on said axles, brake mechanism on each axle including a member in the pivotal axis of its respective axle, means for holding said axles in substantially fixed relation to their respective pivots, and a member connected to the members in the pivotal axes of said axles at said axes.

14. In a trailer, a main body member, auxiliary members pivoted thereto, wheeled axles, springs supporting said auxiliary members from said axles, brakes for each wheel, connections between the brakes for assuring operation thereof in all steering positions of the auxiliary members, means for operating said brakes simultaneously at various positions of said auxiliary members, and means for fixing said axles relatively to said auxiliary members to insure proper brake operation.

15. In a vehicle, a body member, an auxiliary member pivoted thereto, a wheeled axle, springs supporting said auxiliary member from said axle, brake mechanism for each wheel, an equalizing member connecting said brake operating mechanisms and lying in the pivotal axis of said auxiliary member, a rod pivoted to said equalizing member at said pivotal axis, and a bearing for said rod supported on an axis parallel with said axle, whereby free action of said springs is permitted.

In testimony whereof, I have signed my name to this specification.

JOHN M. EADIE.